US012754311B2

(12) United States Patent
Hunt et al.

(10) Patent No.: US 12,754,311 B2
(45) Date of Patent: Oct. 6, 2026

(54) RADAR SUPER RESOLUTION

(71) Applicants: DENSO International America, Inc., Southfield, MI (US); DENSO CORPORATION, Kariya (JP); Carnegie Mellon University, Pittsburgh, PA (US)

(72) Inventors: Shawn Hunt, Bethel Park, PA (US); Matthew O'Toole, Pittsburgh, PA (US); Kris Kitani, Pittsburgh, PA (US); Yu-Jhe Li, Pittsburgh, PA (US)

(73) Assignees: DENSO INTERNATIONAL AMERICA INC., Southfield, MI (US); DENSO CORPORATION, Kariya (JP); CARNEGIE MELLON UNIVERSITY, Pittsburgh, PA (US)

( * ) Notice: Subject to any disclaimer, the term of this patent is extended or adjusted under 35 U.S.C. 154(b) by 541 days.

(21) Appl. No.: 18/115,437

(22) Filed: Feb. 28, 2023

(65) Prior Publication Data

US 2025/0271572 A1 Aug. 28, 2025

Related U.S. Application Data

(60) Provisional application No. 63/383,111, filed on Nov. 10, 2022.

(51) Int. Cl.

*G01S 13/89* (2006.01)
*G01S 13/42* (2006.01)
*G01S 13/58* (2006.01)

(52) U.S. Cl.

CPC .............. *G01S 13/89* (2013.01); *G01S 13/42* (2013.01); *G01S 13/58* (2013.01)

(58) Field of Classification Search

CPC ........... G01S 13/89; G01S 13/42; G01S 13/58
See application file for complete search history.

(56) References Cited

U.S. PATENT DOCUMENTS

2021/0208247 A1* 7/2021 John Wilson et al. . G01S 7/417
2021/0255300 A1* 8/2021 Harrison ............... G01S 13/865
(Continued)

FOREIGN PATENT DOCUMENTS

CN 113238201 A 8/2021

OTHER PUBLICATIONS

Author Unknown, "Navtech Radar Device Technical Description", ClearWay Software and Sensors [online], [retrieved on Jan. 23, 2023], 10 pages. Retrieved from: https://navtechradar.com/clearway- technicalspecifications.
(Continued)

*Primary Examiner* — Vladimir Magloire
*Assistant Examiner* — Kimberly Jenkins
(74) *Attorney, Agent, or Firm* — Christopher G. Darrow; Darrow Mustafa PC

(57) ABSTRACT

Systems, methods, and other embodiments described herein relate to improving radar data. In one embodiment, a method includes, responsive to acquiring radar data from a radar sensor, transforming the radar data into improved data according to a super-resolution model. The method includes converting the improved data into a range-azimuth-Doppler map. The method includes generating a high-resolution map from the range-azimuth-Doppler map by applying the super-resolution model to the range-azimuth-Doppler map. The method includes providing the high-resolution map.

14 Claims, 5 Drawing Sheets

(56) References Cited

U.S. PATENT DOCUMENTS

| | | | | |
|---|---|---|---|---|
| 2021/0255304 | A1* | 8/2021 | Fontijne | G01S 13/931 |
| 2022/0308166 | A1* | 9/2022 | Orr | G01S 13/931 |
| 2023/0140890 | A1* | 5/2023 | Tyagi | G06N 3/0455 342/175 |
| 2024/0125921 | A1* | 4/2024 | Wang | G01S 7/417 |
| 2025/0035776 | A1* | 1/2025 | Emadi | G01S 7/2883 |

OTHER PUBLICATIONS

Armanious, et al., "An Adversarial Super-Resolution Remedy for Radar Design Trade-offs", 2019 27th European Signal Processing Conference (EUSIPCO), 2019, pp. 1-5.
Barnes et al., "The Oxford Radar Robotcar Dataset: A Radar Extension to the Oxford Robotcar Dataset", 2020 IEEE International Conference on Robotics and Automation (ICRA), May 31-Aug. 31, 2020, pp. 6433-6438.
Bijelic et al., "Seeing Through Fog Without Seeing Fog: Deep Multimodal Sensor Fusion in Unseen Adverse Weather", IEEE Conference on Computer Vision and Pattern Recognition (CVPR) 2020, 2020, pp. 11682-11692.
Caesar et al., "nuscenes: A multimodal dataset for autonomous driving", IEEE Conference on Computer Vision and Pattern Recognition (CVPR) 2020, 2020, pp. 11621-11631.
Campbell et al., "Super-resolution technique for CW lidar using Fourier transform reordering and Richardson-Lucy deconvolution", Optics Letters, Dec. 15, 2014, pp. 6981-6984, vol. 39, No. 24.
Cruz et al., "Single Image Super-Resolution Based on Wiener Filter in Similarity Domain", IEEE Transactions on Image Processing, Mar. 2018, pp. 1376-1389, vol. 27, No. 3.
Doğu et al., "Truncated singular value decomposition for through-the-wall microwave imaging application", IET Microwaves, Antennas & Propagation, 2020, pp. 260-267,vol. 14, Issue 4.
Dropkin et al., "Superresolution for Scanning Antenna", Proceedings of the 1997 IEEE National Radar Conference, 1997, pp. 306-308.
Geiss et al., "Radar Super Resolution Using a Deep Convolutional Neural Network", Journal of Atmospheric and Oceanic Technology, 2020, pp. 2197-2207, vol. 37, No. 12.
Author Unknown, "TI Designs: TIDEP-0092: Short Range Radar Reference Design Using AWR1642", Texas Instruments Technical Report, Technical Report, 2017, pp. 1-14.
Kim et al., "MulRan: Multimodal Range Dataset for Urban Place Recognition", 2020 IEEE International Conference on Robotics and Automation (ICRA), 2020, pp. 6246-6253.
Ledig et al., "Photo-Realistic Single Image Super-Resolution Using a Generative Adversarial Network", Proceedings of the IEEE Conference on Computer Vision and Pattern Recognition (CVPR), 2017, pp. 4681-4690.
Li et al., "Exploiting Temporal Relations on Radar Perception for Autonomous Driving", IEEE Conference on Computer Vision and Pattern Recognition (CVPR), 2022, pp. 17071-17080.
Li et al., "Bistatic Forward-Looking SAR MP-DPCA Method for Space-Time Extension Clutter Suppression", IEEE Transactions on Geoscience and Remote Sensing, Sep. 2020, pp. 6565-6579, vol. 58, No. 9.
Tsung-Li, et al., "Microsoft COCO: Common Objects in Context", European Conference on Computer Vision (ECCV) 2014, 2014, pp. 740-755.
Mostajabi et al., "High Resolution Radar Dataset for Semi-Supervised Learning of Dynamic Objects", Proceedings of the IEEE Conference on Computer Vision and Pattern Recognition (CVPR), 2022, 8 pages.
Ouaknine et al., "CARRADA Dataset: Camera and Automotive Radar with Range-Angle-Doppler Annotations", 2020 25th International Conference on Pattern Recognition (ICPR), 2021, pp. 5068-5075.
Qian, et al., "Robust Multimodal Vehicle Detection in FoggyWeather Using Complementary Lidar and Radar Signals", IEEE Conference on Computer Vision and Pattern Recognition (CVPR), 2021, pp. 444-453.
Raju et al., "MST radar signal processing using iterative adaptive approach", Geoscience Letters, 2018, pp. 1-10, vol. 5, No. 20.
Rebut et al., "Raw High-Definition Radar for Multi-Task Learning", IEEE Conference on Computer Vision and Pattern Recognition (CVPR), 2022, pp. 17021-17030.
Ronneberger et al., "U-Net: Convolutional Networks for Biomedical Image Segmentation", International Conference on Medical Image Computing and Computer-Assisted Intervention, 2015, pp. 234-241.
Schumann et al., "RadarScenes: A Real-World Radar Point Cloud Data Set for Automotive Applications", 2021 IEEE 24th International Conference on Information Fusion (FUSION), 2021, pp. 1-8.
Sheeny et al., "Radiate: A Radar Dataset for Automotive Perception in Bad Weather", 2021 IEEE International Conference on Robotics and Automation (ICRA 2021), 2021, pp. 1-7.
Stove, "Linear FMCW radar techniques", IEEE Proceedings F (Radar and Signal Processing), 1992, pp. 343-350, vol. 139.
Sun et al., "MIMO Radar for Advanced Driver-Assistance Systems and Autonomous Driving", IEEE Signal Processing Magazine, Jul. 2020, pp. 98-117, vol. 37, No. 4.
Wang et al., "RODNet: Radar Object Detection using Cross-Modal Supervision", Proceedings of the IEEE/CVF Winter Conference on Applications of Computer Vision, 2021, pp. 504-513.
Wang et al., "RODNet: A Real-Time Radar Object Detection Network Cross-Supervised by Camera-Radar Fused Object 3D Localization", IEEE Journal of Selected Topics in Signal Processing, Jun. 2021, pp. 954-967, vol. 15, No. 4.
Wang et al., "Rethinking of Radar's Role: A Camera-Radar Dataset and Systematic Annotator via Coordinate Alignment", IEEE Conference on Computer Vision and Pattern Recognition (CVPR), 2021, pp. 2815-2824.
Zhang et al., "RADDet: Range-Azimuth-Doppler based Radar Object Detection for Dynamic Road Users", 2021 18th Conference on Robots and Vision (CRV), 2021, pp. 95-102.
Zhang et al., "Azimuth Superresolution of Forward-Looking Radar Imaging Which Relies on Linearized Bregman", IEEE Journal of Selected Topics in Applied Earth Observations and Remote Sensing, Jul. 2019, pp. 2032-2043, vol. 12, No. 7.
Zhang et al., "A Bayesian Super-Resolution Method for Forward-Looking Scanning Radar Imaging Based on Split Bregman", 2018 IEEE International Geoscience and Remote Sensing Symposium (IGARSS 2018), 2018, pp. 5135-5138.
Zhang et al., "Wideband Sparse Reconstruction for Scanning Radar", IEEE Transactions on Geoscience and Remote Sensing, Oct. 2018, pp. 6055-6068, vol. 56, No. 10.
Zhang et al., "Airborne Forward-Looking Radar Super-Resolution Imaging Using Iterative Adaptive Approach", IEEE Journal of Selected Topics in Applied Earth Observations and Remote Sensing, Jul. 2019, pp. 2044-2054, vol. 12, No. 7.
Zhang et al., "Fast Split Bregman Based Deconvolution Algorithm for Airborne Radar Imaging", Remote Sensing, 2020, pp. 1-18, vol. 12, No. 11.

* cited by examiner

RADAR SUPER RESOLUTION

CROSS-REFERENCE TO RELATED APPLICATIONS

This application claims benefit of U.S. Provisional Application No. 63/383,111, filed on, Nov. 10, 2022, which is herein incorporated by reference in its entirety.

TECHNICAL FIELD

The subject matter described herein relates in general to systems and methods for improving radar data and, more particularly, to using machine learning models to super-resolve the radar data into high-resolution data for facilitating downstream tasks.

BACKGROUND

The quality of radar data can greatly impact the performance of downstream systems (e.g., object detection, etc.), leading to a higher rate of errors when the quality of the data are lower. For example, in many automotive implementations a radar may include a limited number of antennas/receivers due to cost constraints, thereby directly impacting data quality. One major disadvantage of low-quality radar data is the presence of noise and interference, which can obscure or distort the true radar signal, making it difficult to accurately identify objects. Additionally, low-resolution radar data can make it challenging to distinguish between small or distant objects, leading to missed detections or misclassifications. Furthermore, low-quality radar data can also be affected by multipath propagation, which can cause reflected signals to arrive at the receiver at different times, resulting in distorted or delayed echoes that can further degrade the quality of the data. These issues can have significant consequences for different downstream applications, such as self-driving cars, drones, and other autonomous systems that rely on accurate and reliable radar-based determinations.

SUMMARY

In one embodiment, example systems and methods associated with improving radar data quality through the use of super-resolution are disclosed. As previously noted, the quality of radar data can be directly linked with the hardware that is implemented. In particular, for radars, the quality of data is generally linked with a number of antenna/receiver elements that provide for acquiring more data and thus higher resolution information with a greater number of the elements. However, with the addition of further hardware elements, the cost of the device increases and may also cause design issues with locating the elements on a vehicle or other device that is implementing the radar. Accordingly, many implementations trade off high-quality data for a cost-effective implementation that can be designed into a mobile platform, such as a vehicle. Even still, as vehicles become more technologically forward and implement automated systems, such as advanced driving assistance systems, autonomous control, and so on, the desire for higher-quality information that can facilitate these functions is growing.

Therefore, in one embodiment, a disclosed approach involves using techniques to super-resolve the radar data from existing radar hardware that avoids implementing more costly hardware solutions. That is, an inventive system may implement processing techniques to derive higher-resolution
data instead of implementing hardware with additional antennas/receivers. In one approach, the inventive system includes a processing pipeline that can function in multiple different ways to improve the raw sensor data. The raw sensor data is, in one embodiment, Frequency Modulated Continuous Wave (FMCW) multiple-input multiple outputs (MIMO) radar data. In general, the raw radar data is in a digital form and, thus, has been converted from an analog format as originally received into the digital form.

In any case, the processing pipeline (also referred to herein as the super-resolution model) may be comprised of multiple separate functional sections, including, for example, multiple machine learning models. A first path of the processing pipeline accepts the raw sensor data and functions to hallucinate (i.e., predict) additional inputs as though the raw sensor data includes additional data from virtual antennas/receivers. Thus, the system can combine the additional inputs with the raw sensor data to generate improved data that mimics higher resolution data as if the radar included additional antennas/receivers. The first pipeline includes a machine learning algorithm that up-samples the raw data into intermediate features and then applies a 3D pixel shuffling operation to super-resolve the raw sensor data into improved radar data that includes the additional inputs. Accordingly, the first path provides improvements to the raw radar data that improve downstream tasks, such as object detection.

The second path may accept the raw data or the improved sensor data as input but functions to initially spatially transform the data. Transforming the data may involve applying a Fast Fourier Transform (FFT) to translate the data, either raw or improved, into a range-azimuth-Doppler (RAD) map that is then input into the second path. In one configuration, the second path of the super-resolution model includes a machine learning model having an encoder-decoder architecture with 3D convolutions for processing the RAD map. The encoder-decoder architecture functions to super-resolve the RAD map into a high-resolution map. In general, super-resolving, as discussed in regard to the super-resolution model, is a technique to enhance the radar data and/or map by, for example, inferring additional information to improve the resolution of existing data. In this way, the super-resolution model functions to improve raw radar data from an existing radar sensor that is generally characterized as having a lower quality than high-resolution map data.

In one embodiment, a radar system for improving radar data is disclosed. The radar system includes one or more processors and a memory that is communicably coupled to the one or more processors. The memory stores instructions that, when executed by the one or more processors, cause the one or more processors to, responsive to acquiring the radar data from a radar sensor, transform the radar data into improved data according to a super-resolution model. The instructions include instructions to convert the improved data into a range-azimuth-Doppler map. The instructions include instructions to generate a high-resolution map from the range-azimuth-Doppler map by applying the super-resolution model to the range-azimuth-Doppler map. The instructions include instructions to provide the high-resolution map.

In one embodiment, a non-transitory computer-readable medium is disclosed. The computer-readable medium stores instructions that, when executed by one or more processors, cause the one or more processors to perform the disclosed functions. The instructions include instructions to, responsive to acquiring radar data from a radar sensor, transform the radar data into improved data according to a superresolution model. The instructions include instructions to convert the improved data into a range-azimuth-Doppler map. The instructions include instructions to generate a high-resolution map from the range-azimuth-Doppler map by applying the super-resolution model to the range-azimuth-Doppler map. The instructions include instructions to provide the high-resolution map.

In one embodiment, a method is disclosed. In one embodiment, the method includes, responsive to acquiring radar data from a radar sensor, transforming the radar data into improved data according to a super-resolution model. The method includes converting the improved data into a range-azimuth-Doppler map. The method includes generating a high-resolution map from the range-azimuth-Doppler map by applying the super-resolution model to the range-azimuth-Doppler map. The method includes providing the high-resolution map.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
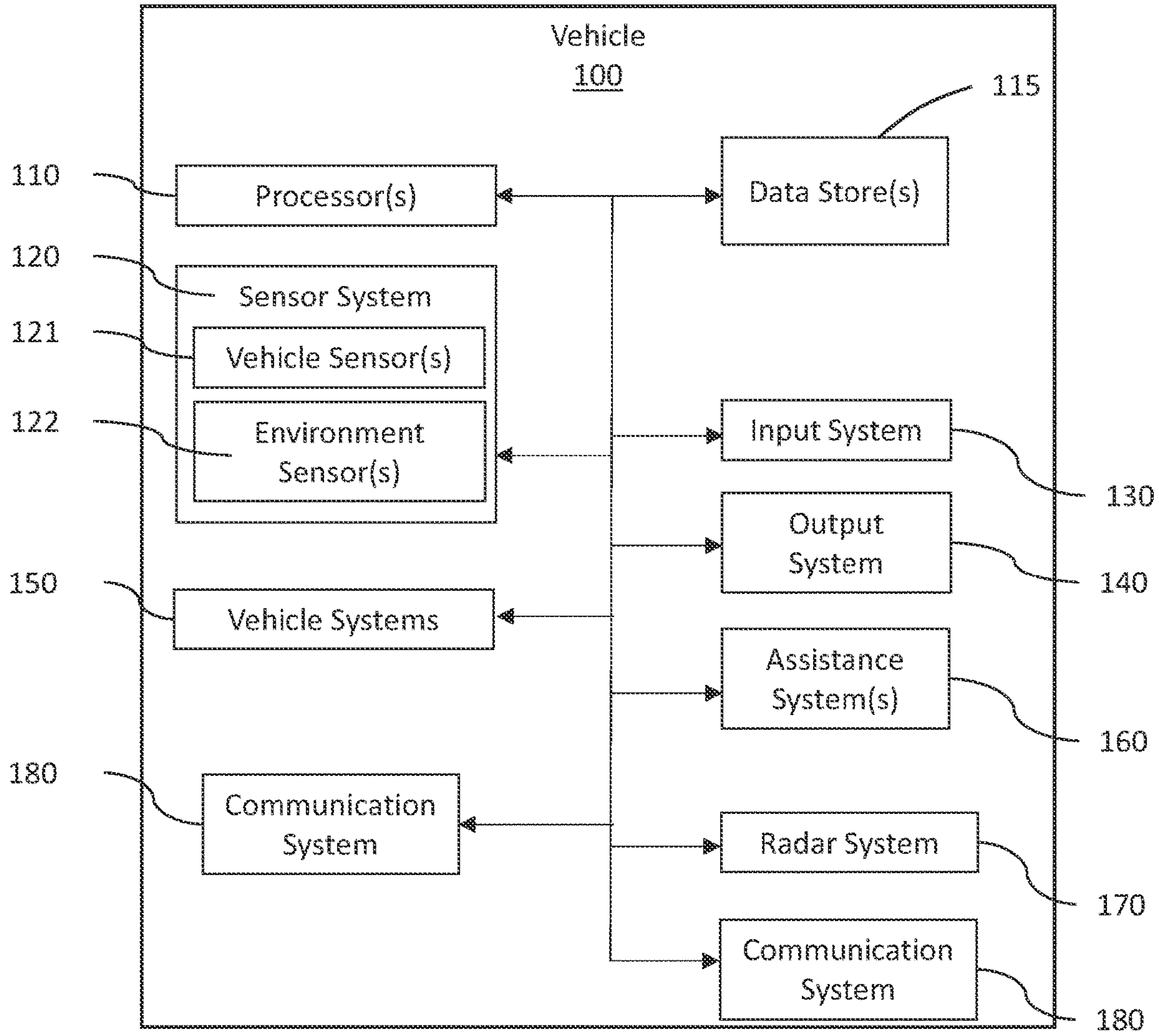
FIG. 1 illustrates one embodiment of a configuration of a vehicle in which example systems and methods disclosed herein may operate.

Systems, methods, and other embodiments associated with improving radar data quality through the use of super-resolution are disclosed. As previously noted, the quality of radar data can be directly linked with the hardware that is implemented. In particular, for radars the quality of data is generally linked with a number of antenna/receiver elements that provide for acquiring data and thus higher resolution information with a greater number of the elements. However, with the addition of further hardware elements, the cost of the device increases and may also cause design issues with locating the elements on a vehicle or other device that is implementing the radar. Accordingly, many implementations trade off high-quality data for a cost-effective implementation that can be designed into a mobile platform, such as a vehicle. Even still, as vehicles become more technologically forward and implement automated systems, such as advanced driving assistance systems, autonomous control, and so on, the desire for higher-quality information that can facilitate these functions is growing.

Therefore, in one embodiment, a disclosed approach involves using techniques to super-resolve the radar data from existing radar hardware that avoids implementing more costly hardware solutions. That is, an inventive system may implement processing techniques to derive higher-resolution data instead of implementing hardware with additional antennas/receivers. In one approach, the inventive system includes a processing pipeline that can function in multiple different ways to improve the raw sensor data. The raw sensor data is, in one embodiment, Frequency Modulated Continuous Wave (FMCW) multiple-input multiple outputs (MIMO) radar data. In general, the raw radar data is in a digital form and, thus, has been converted from an analog format as originally received into the digital form.

In any case, the processing pipeline (also referred to herein as the super-resolution model) may be comprised of multiple separate functional sections, including, for example, multiple machine learning models. A first path of the processing pipeline accepts the raw sensor data and functions to hallucinate (i.e., predict) additional inputs as though the raw sensor data includes additional data from virtual antennas/receivers. Thus, the system can combine the additional inputs with the raw sensor data to generate improved data that mimics higher resolution data as if the radar included additional antennas/receivers. The first pipeline includes a machine learning algorithm that up-samples the raw data into intermediate features and then applies a 3D pixel shuffling operation to super-resolve the raw sensor data into improved radar data that includes the additional inputs. Accordingly, the first path provides improvements to the raw radar data that improve downstream tasks, such as object detection.

The second path may accept the raw data or the improved sensor data as input but functions to initially spatially transform the data. Transforming the data may involve applying a Fast Fourier Transform (FFT) to translate the data, either raw or improved, into a range-azimuth-Doppler (RAD) map that is then input into the second path. In one configuration, the second path of the super-resolution model includes a machine learning model having an encoder-decoder architecture with 3D convolutions for processing the RAD map. The encoder-decoder architecture functions to super-resolve the RAD map into a high-resolution map. In general, super-resolving, as discussed in regard to the super-resolution model, is a technique to enhance the radar data and/or map derived from the radar data by, for example, inferring additional information to improve the resolution of existing data. In this way, the super-resolution model functions to improve raw radar data from an existing radar sensor that is generally characterized as having a lower quality into high-resolution map data.

Referring to FIG. 1, an example of a vehicle 100 is illustrated. As used herein, a “vehicle” is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that, for example, travels on multi-lane roadways with other vehicles and thus benefits from the functionality discussed herein. In still further aspects, instead of a vehicle, the disclosed systems and methods may be implemented in a device that performs machine perception, such as a roadside unit (RSU), an aerial device (e.g., a drone), and so on. Accordingly, the vehicle 100 is shown and described as including the radar system 170 for purposes of the present discussion; however, in further aspects, the radar system 170 may be located in other devices.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-6 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a radar system 170 that functions to improve radar data acquired from a radar sensor. Moreover, while depicted as a standalone component, in one or more embodiments, the radar system 170 is integrated with the assistance system 160 or another similar system of the vehicle 100 to facilitate functions of the other systems/modules. The noted functions and methods will become more apparent with a further discussion of the figures.

Furthermore, the assistance system 160 may take many different forms but generally provides some form of automated assistance to an operator of the vehicle 100. For example, the assistance system 160 may include various advanced driving assistance system (ADAS) functions, such as a lane-keeping function, adaptive cruise control, collision avoidance, emergency braking, and so on. In further aspects, the assistance system 160 may be a semi-autonomous or fully autonomous system that can partially or fully control the vehicle 100. Accordingly, the assistance system 160, in whichever form, functions in cooperation with sensors of the sensor system 120 to acquire observations about the surrounding environment from which additional determinations can be derived in order to provide the various functions.

As a further aspect, the vehicle 100 also includes a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via short-range communications, such as a Bluetooth, WiFi, or another suitable protocol for communicating between the vehicle 100 and other nearby devices (e.g., other vehicles). Moreover, the communication system 180, in one arrangement, further communicates according to a long-range protocol, such as the global system for mobile communication (GSM), Enhanced Data Rates for GSM Evolution (EDGE), or another communication technology that provides for the vehicle 100 communicating with a cloud-based resource. In either case, the system 170 can leverage various wireless communications technologies to facilitate communications with nearby vehicles (e.g., vehicle-to-vehicle (V2V)), nearby infrastructure elements (e.g., vehicle-to-infrastructure (V2I)), and so on. For example, in one or more arrangements, the radar system 170 may communicate acquired information (e.g., high-resolution radar-based maps) to nearby or remote entities.

Figure 2:
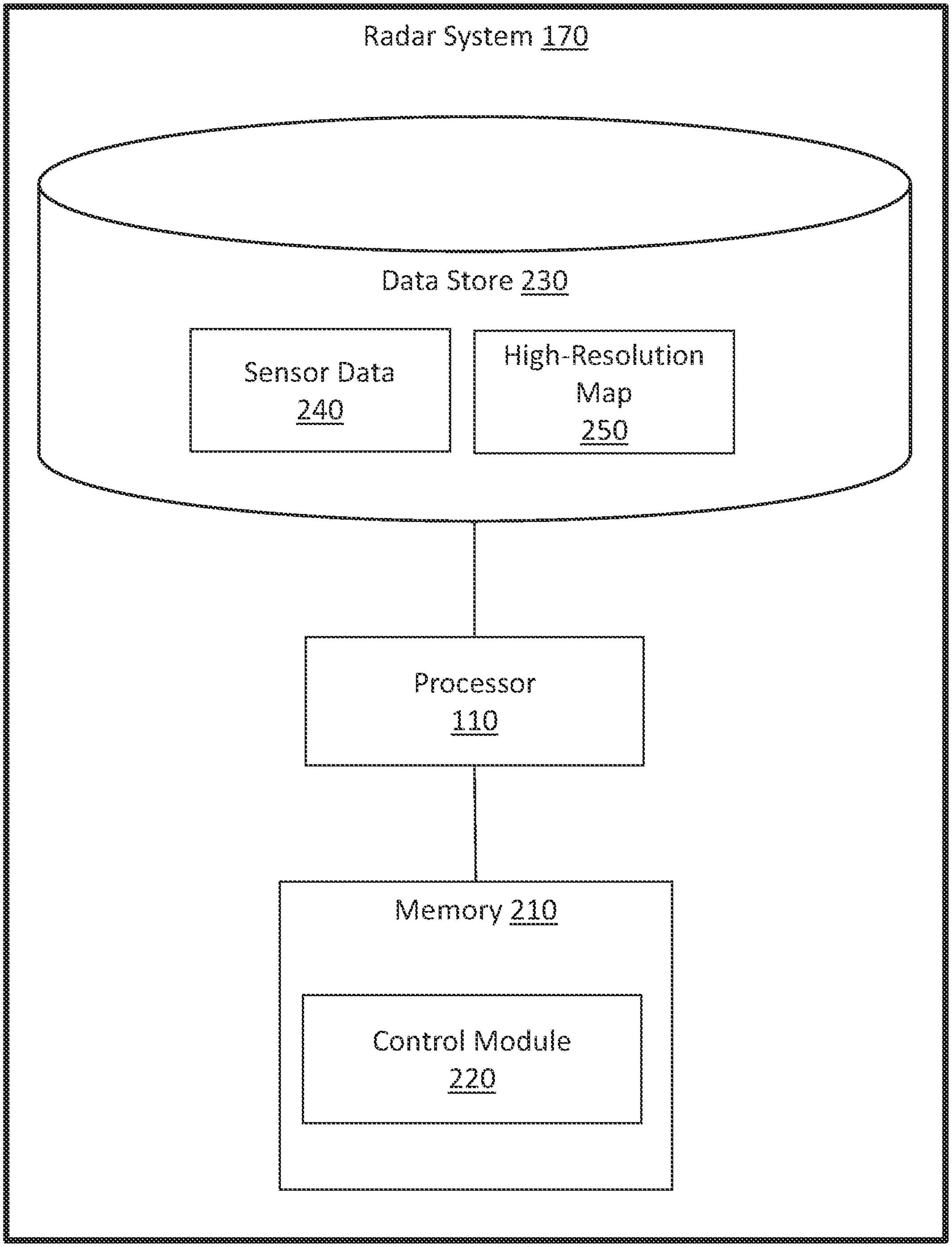
FIG. 2 illustrates one embodiment of a radar system that is associated with improving raw radar data.
Figure 3:
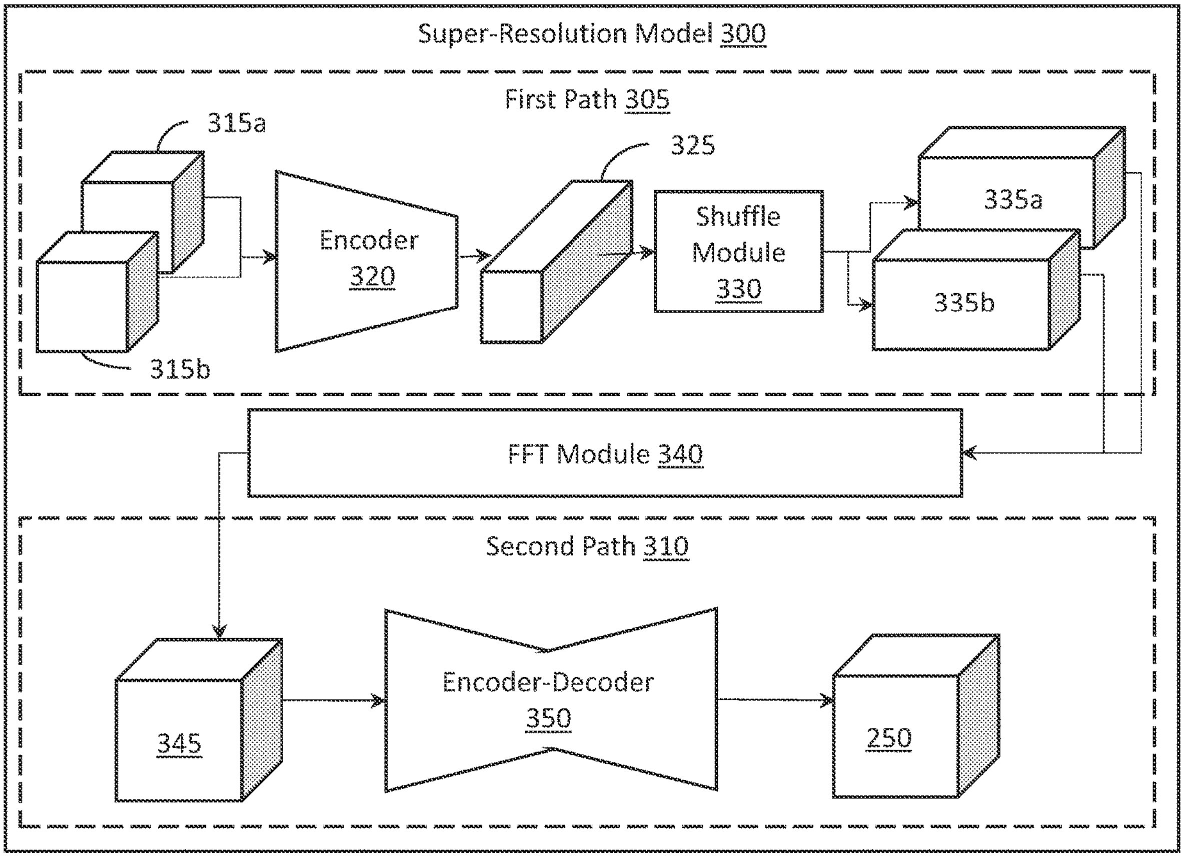
FIG. 3 illustrates one example of a super-resolution model.

With reference to FIG. 2, one embodiment of the radar system 170 is further illustrated. As shown, the radar system 170 includes a processor 110. Accordingly, the processor 110 may be a part of the radar system 170, or the radar system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor, that is capable of performing various functions as described herein when executing encoded functions associated with the radar system 170.

In one embodiment, the radar system 170 includes a memory 210 that stores the control module 220. The memory 210 is a random-access memory (RAM), read-only memory (ROM), a hard disk drive, a flash memory, or other suitable memory for storing the module 220. The module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware such as processing components (e.g., controllers), circuits, etc. for independently performing one or more of the noted functions.

Furthermore, in one embodiment, the radar system 170 includes a data store 230. The data store 230 is, in one arrangement, an electronically-based data structure for storing information. For example, in one approach, the data store 230 is a database that is stored in the memory 210 or another suitable medium, and that is configured with routines that can be executed by the processor 110 for analyzing stored data, providing stored data, organizing stored data, and so on. In any case, in one embodiment, the data store 230 stores data used by the module 220 in executing various functions. In one embodiment, the data store 230 includes sensor data 240, and a high-resolution map 250 along with, for example, other information that is used by the control module 220.

Accordingly, the control module 220 generally includes instructions that function to control the processor 110 to acquire data inputs from one or more sensors of the vehicle 100 that form the sensor data 240. In general, the sensor data 240 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is traveling or parked.

While the control module 220 is discussed as controlling the various sensors to provide the sensor data 240, in one or more embodiments, the control module 220 can employ other techniques to acquire the sensor data 240 that are either active or passive. For example, the control module 220 may passively sniff the sensor data 240 from a stream of electronic information provided by the various sensors to further components within the vehicle 100. Moreover, the control module 220 can undertake various approaches to fuse data from multiple sensors when providing the sensor data 240. Thus, the sensor data 240, in one embodiment, represents a combination of perceptions acquired from multiple sensors and/or other aspects of the vehicle 100. For example, in a further configuration, the sensor data 240 may include information acquired via the communication system 180, such as data from other vehicles and/or infrastructure devices about the average speed of traffic.

In any case, the control module 220 acquires the sensor data 240 that includes at least raw radar data. The control module 220 or another system of the vehicle (e.g., a radar sensor itself) converts analog radar data into the raw radar data in an electronic form via an analog-to-digital converter. In general, the radar sensor includes a set number of transmitters and receivers/antennas. The antennas are physical antennas located at various locations on the vehicle 100 to acquire reflected signals originally emitted from the transmitters. In one arrangement, the radar sensor includes three transmitters and four receivers/antennas. Of course, in further arrangements, the number of transmitters and receivers/antennas may vary.

In any case, the control module 220 acquires the sensor data 240 that includes the raw radar data, which has a lower resolution/quality than what may be generally desired. Accordingly, the control module 220 functions to apply the super-resolution model to the acquired data to generate data with improved characteristics, which is ultimately output in the form of the high-resolution map 250. Accordingly, with reference to FIG. 3, one approach to super-resolving high-resolution radar data using a super-resolution model 300 will be further described.

The super-resolution model 300 includes a first path 305, and a second path 310, as shown. It should be appreciated that while the super-resolution model 300 is shown as including the two paths, in various configurations, one of the paths may be omitted as will be described further subsequently. The super-resolution model 300 accepts raw radar data 315*a* and 315*b* as two separate channels of information. The separate channels represent separate aspects of the radar data, including real and imaginary data. The raw radar data 315 itself is comprised of, for example, information from three separate transmitters that is acquired by four separate receivers/antennas. Of course, this is one example, and in further configurations, the number of transmitters and receivers/antennas may vary. In any case, the raw data 315 is provided into the first path 305, which generally functions to hallucinate additional information as if there were additional virtual antennas.

Thus, the encoder 320 is a convolutional neural network that is comprised of, for example, six residual blocks using 3D convolutions and skip-connections. The encoder 320 functions to encode the raw radar data 315 into intermediate features 325 that are upsampled in relation to the original data. The shuffle module 330 then processes the intermediate features into improved radar data 335*a* and 335*b*, which remains in the two-channel format, including a channel of real data and a channel of imaginary data. The shuffle module 330 performs feature pixel shuffling on the intermediate features 325 to generate the improved data 335 in the appropriate form. The encoder 320, in combination with the shuffle module 330, super-resolve the improved data 335 to provide the improved data with additional channels of information. For example, whereas the raw radar data 315 may be comprised of information from four receivers, the improved data 335 is comprised of, for example, information from twelve receivers. Thus, the first path 305 hallucinates or predicts information from additional virtual antennas in order to further populate the data to estimate a higher resolution sensor.

As previously noted, the first path 305 and the second path 310 may function separately in various approaches; thus, the raw radar data 315 can be provided directly into the FFT module 340 when the first path 305 is not implemented. Similarly, the improved data 335 can be transformed by the FFT module 340 to generate the range-azimuth-Doppler map 345 as the high-resolution map 250 when the second path is not implemented. In either case, both paths operate to improve the original information through super-resolution functions. Continuing with the FFT module 340, the FFT module 340 functions to transform the improved data 335 into a range-azimuth-Doppler (RAD) map 345. In general, the FFT module 340 spatially transforms the improved data 335 according to, for example, a time-discrete FFT.

Once transformed into the RAD map 345, the second path 310 can super-resolve the high-resolution map 250. In particular, the second path includes an encoder-decoder 350 that includes multiple layers of 2D convolutions and max pooling layers followed by 3D convolutions. In particular, upsampling blocks in the encoder-decoder 350 uses trilinear upsampling to facilitate super-resolving the RAD map 345 into the high-resolution map 250. In any case, the super-resolution model 300 broadly functions to implement the super-resolution as a 3D image-to-image translation task that results in information having a higher quality than the original raw radar data 315. As a result, the super-resolution model 300 improves the confidence of object detections because of the improved quality, thereby further improving the functioning of subsequent tasks that rely on such information. Accordingly, the radar system 170 can then improve the functioning of various automated driving tasks through the direct manipulation of the raw radar data 315.

Figure 4:
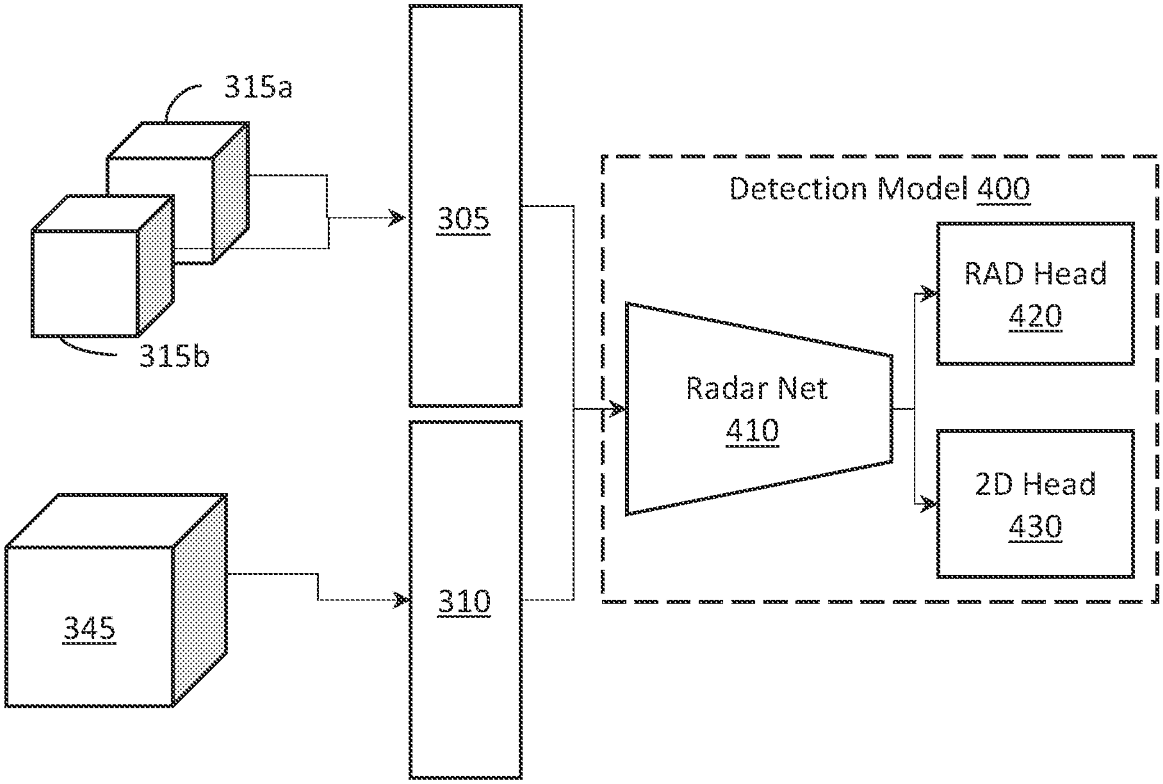
FIG. 4 illustrates one configuration of a first path and a second path of a super-resolution model.

With reference to FIG. 4, a further configuration of the super-resolution model 300 is shown. In FIG. 4, the first path 305 and the second path 310 function parallel to provide the improved data 335 and the high-resolution map 250 into a detection model 400. The detection model 400 represents a downstream task that is performed, for example, in the vehicle 100 in support of further tasks, such as automated driving tasks (e.g., ADAS, semi-autonomous, or fully autonomous control). The detection model 400 implements a feature encoder as the radar net. The radar net 410 can be a ResNet or similar convolutional encoder that functions to provide information to multiple decoder heads, the RAD head 420, and the 2D head 430. The separate heads 420 and 430 function to provide separate detections of objects using the additional information acquired from the super-resolution model 300.

Figure 5:
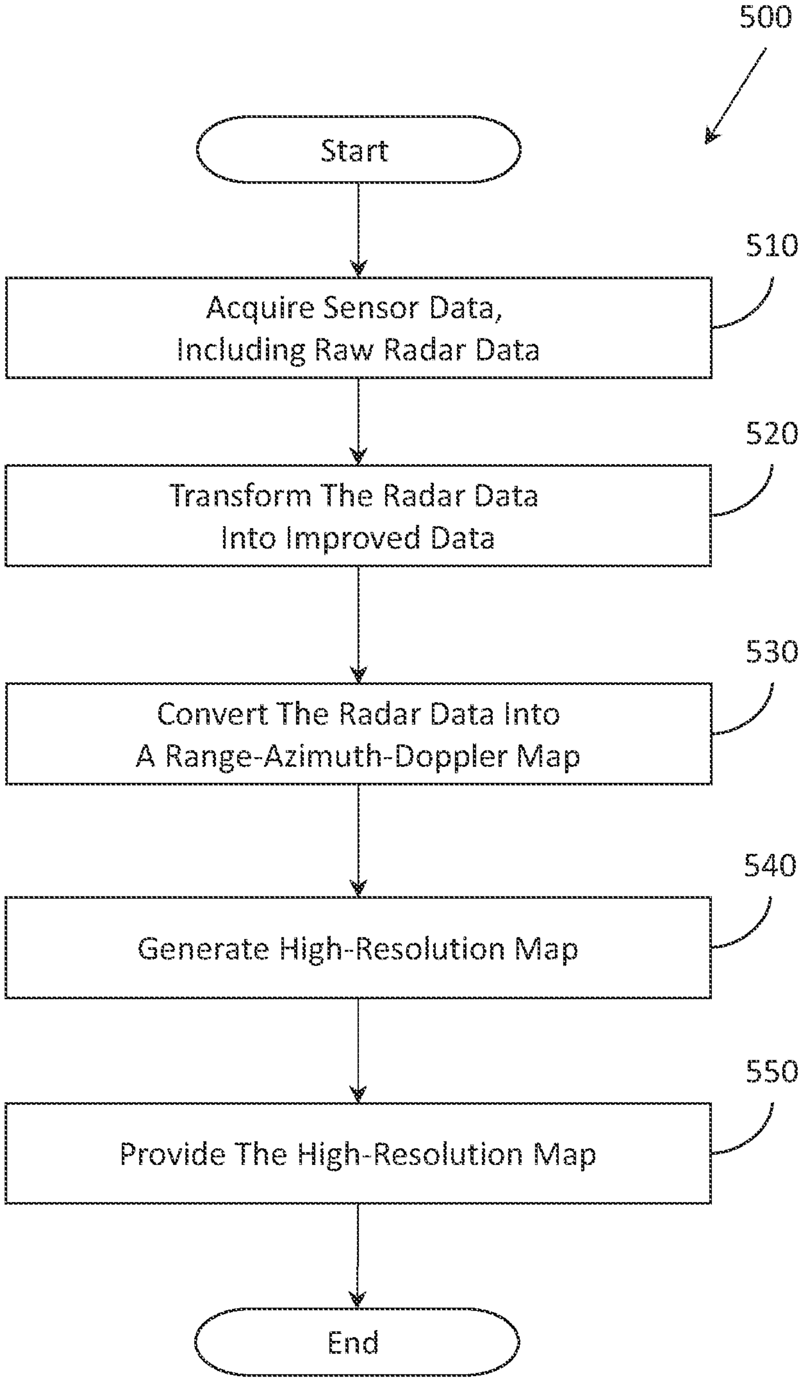
FIG. 5 illustrates one embodiment of a method associated with improving raw radar data using a super-resolution model.

Additional aspects of improving radar data using super-resolution will be discussed in relation to FIG. 5. FIG. 5 illustrates a method 500 associated with processing raw sensor data into high-resolution map information using a super-resolution model. Method 500 will be discussed from the perspective of the radar system 170 of FIG. 1. While method 500 is discussed in combination with the radar system 170, it should be appreciated that the method 500 is not limited to being implemented within the radar system 170 but is instead one example of a system that may implement the method 500.

At 510, the control module 220 acquires the sensor data 240. In one embodiment, acquiring the sensor data 240 includes controlling one or more sensors of the vehicle 100 to generate observations about the surrounding environment of the vehicle 100. The control module 220, in one or more implementations, iteratively acquires the sensor data 240 from one or more sensors of the sensor system 120. The sensor data 240 includes observations of a surrounding environment of the subject vehicle 100. As noted previously, the sensor data 240 includes at least radar data from a radar of the vehicle 100. The radar data is generally provided in a digital format from an ADC.

At 520, the control module 220 transforms the radar data into improved data according to a super-resolution model. The control module 220 transforms the radar data by predicting virtual data associated with virtual antennas and combining the virtual data with the radar data to form the improved data. This process of predicting the virtual data extends the existing raw radar data to appear as though the raw radar data includes information from additional receivers that are not actually present. The control module 220 achieves this task through the use of the super-resolution model that includes, for example, a convolutional neural network in combination with a module for three-dimensional (3D) pixel shuffling to super-resolve the improved data from the raw radar data.

At 530, the control module 220 converts the improved data into a range-azimuth-Doppler map. The control module 220, in at least one approach, applies a Fast Fourier Transform (FFT) to the improved data to translate the improved data into a Range-Azimuth-Doppler (RAD) coordinate space. That is, the FFT performs a spatial translation from time-series information into a spatial representation that is the RAD map. The RAD map representation provides an interpretable form of the data that can be processed using the super-resolution model and subsequent task-specific neural networks for downstream tasks, such as object detection.

At 540, the control module 220 generates a high-resolution map from the RAD map by applying the super-resolution model to the RAD map. The control module 220 generates the high-resolution map, in one approach, by using the model to super-resolve the RAD map. As described, the super-resolution model is a machine learning algorithm in the form of a neural network that includes a three-dimensional (3D) encoder-decoder that translates the range-azimuth-Doppler map into the high-resolution map through super-resolving the high-resolution map using the encoder-decoder structure of the super-resolution model. In this way, the control module 220 uses the super-resolution model to predict further information that is not present in the RAD map and thereby improve the RAD map to a higher resolution.

At 550, the control module 220 provides the high-resolution map. In one approach, the control module 220 provides the high-resolution map to further systems within the vehicle to facilitate subsequent tasks. In one example, the control module 220 provides the high-resolution map to an object detection module that applies a neural network for detecting objects in an environment around the vehicle 100. In general, the high-resolution map provides for improving a confidence of the detection of the objects since the processed information is more abundant, thereby resolving issues with noise and areas with diminished radar returns. It should be appreciated that the control module 220 may provide the high-resolution map directly to other systems of the vehicle 100, such as the assistance system 160, and/or provide the detections. In any case, the result of the present approach undertaken by the control module 220 is improved radar data using existing hardware with, for example, a limited number of receivers, thereby facilitating improved functionality and control of the vehicle 100.

Additionally, it should be appreciated that the radar system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all of the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the radar system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 240). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the radar system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the radar system 170, and/or the assistance system 160 may control some or all of these vehicle systems 150 and, thus, may be partially or fully autonomous.

The processor(s) 110, the radar system 170, and/or the assistance system 160 can be operatively connected to communicate with the various vehicle systems 150 and/or individual components thereof. For example, returning to FIG. 1, the processor(s) 110, the radar system 170, and/or the assistance system 160 can be in communication to send and/or receive information from the various vehicle systems 150 to control the movement, speed, maneuvering, heading, direction, etc. of the vehicle 100. The processor(s) 110, the radar system 170, and/or the assistance system 160 may control some or all of these vehicle systems 150.

The processor(s) 110, the radar system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the radar system 170, and/or the assistance system 160 can control the direction and/or speed of the vehicle 100. The processor(s) 110, the radar system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the radar system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the radar system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A radar system for improving radar data, comprising:

one or more processors;

a memory communicably coupled to the one or more processors and storing instructions that, when executed by the one or more processors, cause the one or more processors to:

responsive to acquiring the radar data from a radar sensor, transform the radar data into improved data according to a first path of a super-resolution model for super-resolving the radar data that is raw digital data from the radar sensor, wherein the instructions to transform the radar data include instructions to apply a convolutional network in combination with three-dimensional (3D) pixel shuffling to super-resolve the improved data;

convert the improved data into a range-azimuth-Doppler (RAD) map;

generate a high-resolution map from the RAD map by applying a second path of the super-resolution model to the RAD map for super-resolving the RAD map into the high-resolution map; and provide the high-resolution map.

2. The radar system of claim 1, wherein the instructions to transform the radar data include instructions to predict virtual data associated with virtual antennas and combine the virtual data with the radar data to form the improved data.

3. The radar system of claim 1, wherein the instructions to generate the high-resolution map include instructions to super-resolve the range-azimuth-Doppler map to generate the high-resolution map using the super-resolution model, and wherein the super-resolution model includes a three-dimensional (3D) encoder-decoder that translates the range-azimuth-Doppler map into the high-resolution map through super-resolving the high-resolution map.

4. The radar system of claim 1, wherein the instructions to convert the improved data includes instructions to apply a Fast Fourier transform (FFT) to the improved data to translate the improved data into a Range-Azimuth-Doppler (RAD) coordinate space.

5. The radar system of claim 1, wherein the instructions to provide the high-resolution map includes instructions to detect objects in an environment around a vehicle that includes the radar sensor according to a machine-learning algorithm that process the high-resolution map.

6. The radar system of claim 1, wherein the instructions to provide the high-resolution map include instructions to autonomously control a vehicle based, at least in part, on the high-resolution map.

7. A non-transitory computer-readable medium storing instructions that, when executed by one or more processors, cause the one or more processors to:

responsive to acquiring radar data from a radar sensor, transform the radar data into improved data according to a first path of a super-resolution model for super-resolving the radar data that is raw digital data from the radar sensor, wherein the instructions to transform the radar data include instructions to apply a convolutional network in combination with three-dimensional (3D) pixel shuffling to super-resolve the improved data;

convert the improved data into a range-azimuth-Doppler (RAD) map;

generate a high-resolution map from the RAD map by applying a second path of the super-resolution model to the RAD map for super-resolving the RAD map into the high-resolution map; and provide the high-resolution map.

8. The non-transitory computer-readable medium of claim 7, wherein the instructions to transform the radar data include instructions to predict virtual data associated with virtual antennas and combine the virtual data with the radar data to form the improved data.

9. The non-transitory computer-readable medium of claim 7, wherein the instructions to generate the high-resolution map include instructions to super-resolve the range-azimuth-Doppler map to generate the high-resolution map using the super-resolution model, and wherein the super-resolution model includes a three-dimensional (3D) encoder-decoder that translates the range-azimuth-Doppler map into the high-resolution map through super-resolving the high-resolution map.

10. A method, comprising:

responsive to acquiring radar data from a radar sensor, transforming the radar data into improved data according to a first path of a super-resolution model for super-resolving the radar data that is raw digital data from the radar sensor, including applying a convolutional network in combination with three-dimensional (3D) pixel shuffling to super-resolve the improved data;

converting the improved data into a range-azimuth-Doppler (RAD) map;

generating a high-resolution map from the RAD map by applying a second path of the super-resolution model to the RAD map for super-resolving the RAD map into the high-resolution map; and providing the high-resolution map.

11. The method of claim 10, wherein transforming the radar data includes predicting virtual data associated with virtual antennas and combining the virtual data with the radar data to form the improved data.

12. The method of claim 10, wherein generating the high-resolution map includes super-resolving the range-azimuth-Doppler map to generate the high-resolution map using the super-resolution model, wherein the super-resolution model includes a three-dimensional (3D) encoder-decoder that translates the range-azimuth-Doppler map into the high-resolution map through super-resolving the high-resolution map.

13. The method of claim 10, wherein converting the improved data includes applying a Fast Fourier transform (FFT) to the improved data to translate the improved data into a Range-Azimuth-Doppler (RAD) coordinate space.

14. The method of claim 10, wherein providing the high-resolution map includes detecting objects in an environment around a vehicle that includes the radar sensor according to a machine-learning algorithm that process the high-resolution map.

* * * * *